US012587407B2

(12) United States Patent
Moran et al.

(10) Patent No.: US 12,587,407 B2
(45) Date of Patent: Mar. 24, 2026

(54) SYSTEM AND METHODS FOR HOSTING DYNAMICALLY-GENERATED NETWORK PROVIDER CONTENT THROUGH A LOCAL AREA NETWORK GATEWAY

(71) Applicant: Charter Communications Operating, LLC, St. Louis, MO (US)

(72) Inventors: David T. Moran, Centennial, CO (US); Ian D. Biggs, Parker, CO (US); Anthony Adams, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 348 days.

(21) Appl. No.: 18/391,341

(22) Filed: Dec. 20, 2023

(65) Prior Publication Data

US 2025/0211462 A1     Jun. 26, 2025

(51) Int. Cl.
*H04L 61/5014* (2022.01)
*H04L 12/28* (2006.01)
*H04L 12/66* (2006.01)
*H04L 101/622* (2022.01)

(52) U.S. Cl.
CPC .......... *H04L 12/2856* (2013.01); *H04L 12/66* (2013.01); *H04L 61/5014* (2022.05); *H04L 2101/622* (2022.05)

(58) Field of Classification Search
CPC . H04L 12/2856; H04L 12/66; H04L 61/5014; H04L 2101/622

USPC .......................................................... 370/401
See application file for complete search history.

(56) References Cited

U.S. PATENT DOCUMENTS

| | | | | |
|---|---|---|---|---|
| 8,463,890 B2 * | 6/2013 | Bush | ....................... | H04L 41/26 |
| | | | | 709/224 |
| 8,713,641 B1 | 4/2014 | Pagan et al. | | |
| 9,712,421 B2 * | 7/2017 | Dolson | ................. | H04L 63/306 |
| 10,992,784 B2 * | 4/2021 | Decenzo | .............. | H04L 65/612 |
| 2017/0070563 A1 * | 3/2017 | Sundermeyer | ........ | H04L 67/025 |
| 2023/0036050 A1 * | 2/2023 | Kakhki | ................. | H04L 41/046 |

* cited by examiner

*Primary Examiner* — Christopher M Crutchfield
*Assistant Examiner* — Syed Ahmed
(74) *Attorney, Agent, or Firm* — The Marbury Law Group, PLLC

(57)     ABSTRACT

Systems, methods, and devices for providing subscriber-specific dynamic content by one or more server computing device in an operator network. The server computing device may configure a gateway device for at least one user local area network (LAN) to access a dynamic content service, receive a dynamic content request from the gateway device, access data sources supporting the dynamic content service to retrieve information about a user device, and determine whether any service disruption condition has been met. If a service disruption condition has been met, the server computing device may generate subscriber-specific dynamic content based on the service disruption condition met, and send the generated subscriber-specific dynamic content to the gateway device for presenting to the user device.

30 Claims, 7 Drawing Sheets

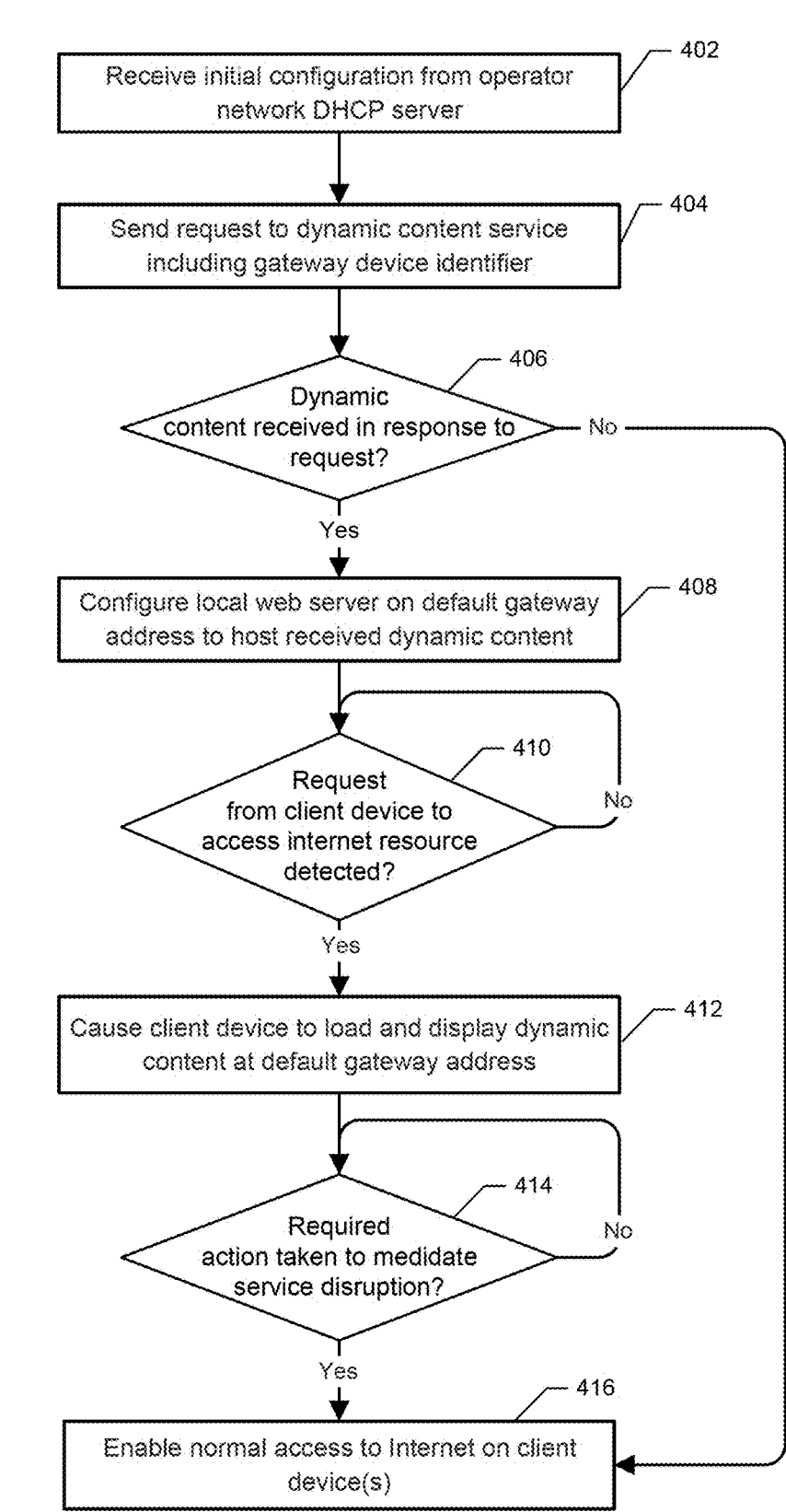

400

402 — Receive initial configuration from operator network DHCP server

404 — Send request to dynamic content service including gateway device identifier 406 — Dynamic content received in response to request? — No Yes 408 — Configure local web server on default gateway address to host received dynamic content 410 — Request from client device to access internet resource detected? — No Yes 412 — Cause client device to load and display dynamic content at default gateway address 414 — Required action taken to medidate service disruption? — No Yes 416 — Enable normal access to Internet on client device(s)

FIG. 4

500

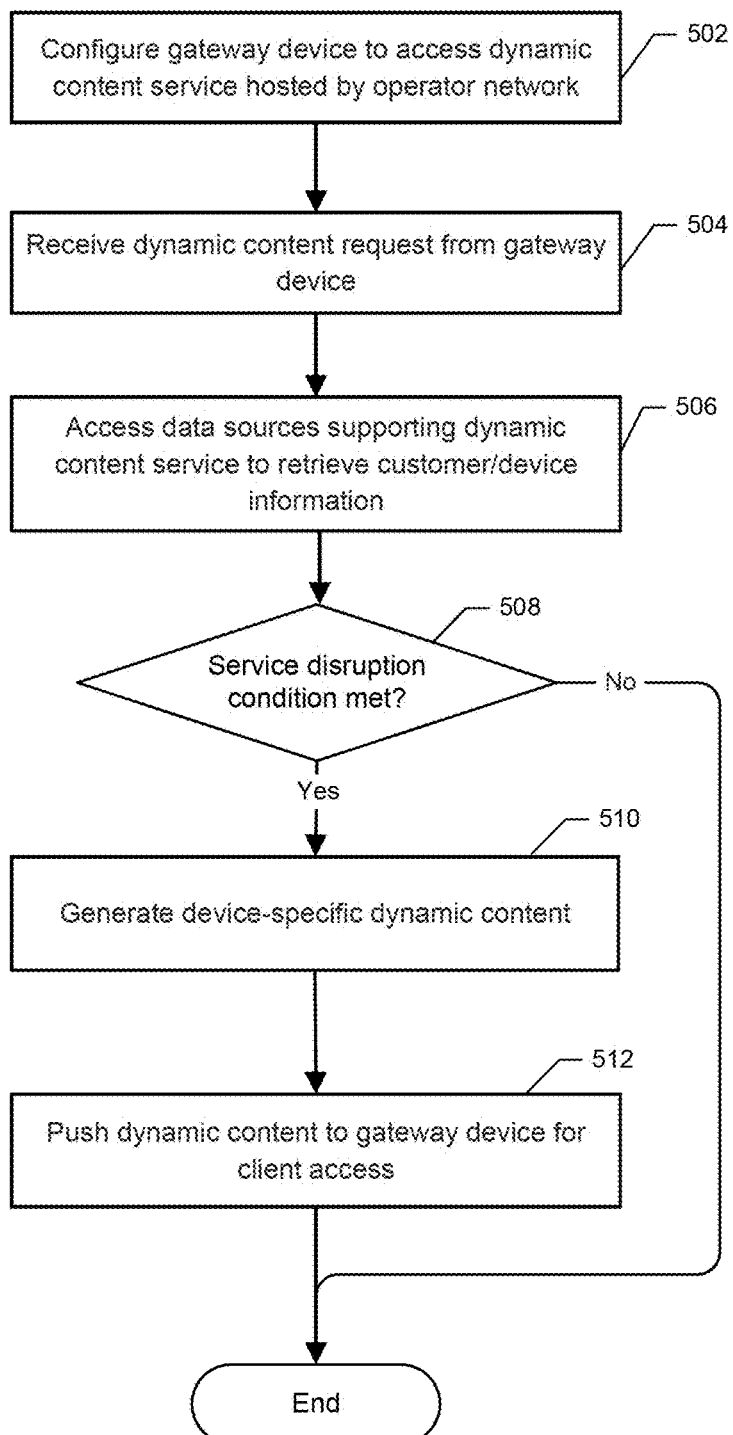

502 — Configure gateway device to access dynamic content service hosted by operator network 504 — Receive dynamic content request from gateway device 506 — Access data sources supporting dynamic content service to retrieve customer/device information 508 — Service disruption condition met?

No

Yes

510 — Generate device-specific dynamic content

512 — Push dynamic content to gateway device for client access

End

FIG. 5

SYSTEM AND METHODS FOR HOSTING DYNAMICALLY-GENERATED NETWORK PROVIDER CONTENT THROUGH A LOCAL AREA NETWORK GATEWAY

BACKGROUND

Wired and wireless communication technologies have seen dramatic improvements over the past several years. Due to these improvements, user equipment (UE) devices, such as smartphone and tablets, have become ubiquitous personal accessories, providing users with access to Internet Protocol (IP) and data services anywhere, at any time. In addition, Internet Service Providers (ISPs) now offer their customers a large number of complex and feature-rich private network services, such as speed caps, service pause and resume, fine grained parental controls, built-in support for smart appliances, high speed access to devices (e.g., personal computers, printers, TVs, etc.) within the home or local area network, etc. Most subscribers today connect to the Internet using a single home router or modem/router combination (i.e., gateway device), which provides network connectivity to enable Internet access.

Operation of a service provider network requires not only the resources to establish communications but also the resources to manage the network. Individual subscribers (e.g., customers) represent both a business opportunity and, in instances of abuse to the network or their service commitments, a threat to the network. Managing subscribers and their use of the various network resources is therefore an important issue for operators. Examples of subscriber management activities include managing new activations, isolation and cleansing of virus-spreading subscribers, compelling subscribers to upgraded service-related software, isolating and managing a subscriber who is abusing the network or exceeding the service resources available to that subscriber, offering a subscriber a new tier of service, and more.

Some service providers may impose service thresholds, for example, bandwidth limits, outbound limits on e-mail, etc. Additionally, network operators may be motivated to market new or upgraded services to subscribers, preferably on a personalized basis. However, such management may be time consuming and resource intensive.

Service network providers may interact with subscribers on an automated basis during the auto-provisioning process. In particular, a device that requires provisioning (e.g., a cable modem) may be validated as authorized for connection to the cable system, and given information that establishes the device level of service, identification codes, and network address. However, mechanisms are needed to inform customers of up-to-date service information that are specific to that customer and/or hardware providing network access.

SUMMARY

The various aspects include methods of providing subscriber-specific dynamic content by an operator network, which may include configuring a gateway device for at least one user local area network (LAN) (i.e., client) to access a dynamic content service, receiving a dynamic content request from the gateway device, accessing data sources supporting the dynamic content service to retrieve information about a user device, determining whether any service disruption condition has been met. Various aspects may further include, in response to determining that a service disruption condition has been met, generating subscriber-specific dynamic content for the user device based on the service disruption condition met, and sending the generated subscriber-specific dynamic content to the gateway device for presenting to the user device.

In some aspects, configuring the gateway device may include sending Dynamic Host Configuration Protocol (DHCP) configuration information to the gateway device. In some aspects, the DHCP configuration information may include a web address for the dynamic content service.

In some aspects, the received dynamic content request may include a device identifier assigned to the gateway device. In some aspects, the retrieved information about the user device may include at least one of customer data or equipment data associated with the device identifier. In some aspects, the device identifier may include a media access control (MAC) address. In some aspects, determining whether any service disruption condition has been met may include determining whether the retrieved information about the user device fulfills any of a plurality of predetermined criteria sets designated by the operator network.

In some aspects, the data sources supporting the dynamic content service may include at least one entity with information about one or more of customer billing, subscriptions, network equipment, and network usage. In some aspects, generating the subscriber-specific dynamic content for the user device may be based on a preloaded template corresponding to the service disruption condition met. In some aspects, the subscriber-specific dynamic content may include information to enable the user device to mediate the service disruption condition.

Various aspects further include methods of providing dynamic content generated by a communications service provider to one or more client device, which may include receiving, via a gateway device associated with a local area network (LAN) for the one or more client device, information to access a service provider network, sending a request including a hardware-specific identifier to the dynamic content service, and determining whether dynamic content is received in response to the request. In some aspects, the information may include instructions to contact a dynamic content service within the service provider network. Various aspects may further include, in response to determining that dynamic content is received, configuring a web server to host the received dynamic content on a default gateway address. In some aspects, the dynamic content may inform the one or more client device in the LAN about a cause of network service disruption.

Various aspects may further include sending a request to a Dynamic Host Configuration Protocol (DHCP) server in the service provider network. In some aspects, the configuration information may be received from the DHCP server in response to the request. Various aspects may further include detecting a request from the one or more client device in the LAN to access an Internet resource through the service provider network, and causing the one or more client device to display the received dynamic content on a user device interface. In some aspects, the dynamic content displayed on the user device interface may include an instruction for mediating the network service disruption. In some aspects, the instruction for mediating the network service disruption may include at least one of a link to a web page hosted by the service provider network, readable text coupled with an acknowledgement of information in the text, and contact information for a customer service entity of the service provider network.

Further aspects may include a server computing device and/or a gateway device having a processor configured with processor-executable instructions to perform operations of any of the methods summarized above. Further aspects may include a non-transitory processor-readable storage medium having stored thereon processor-executable instructions configured to cause a processor of a server computing device and/or a gateway device to perform operations of any of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 4 is a process flow diagram illustrating an embodiment method for configuring a gateway device to host dynamic content generated by a service provider network according to some embodiments.

FIG. 5 is a process flow diagram illustrating an example method for using a dynamic content service to generate account/subscriber-specific content based on service disruption conditions.

DETAILED DESCRIPTION

Figure 1:
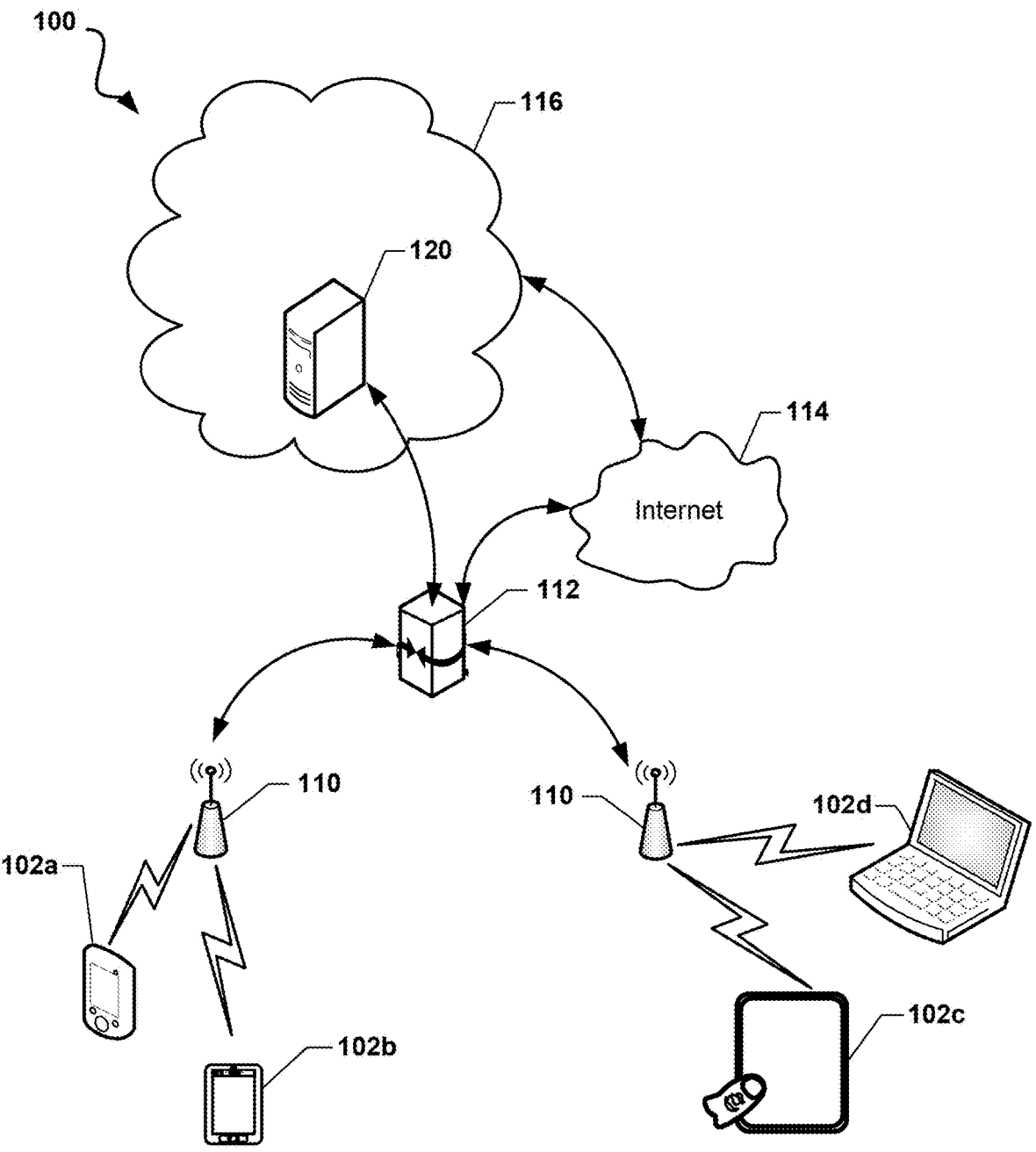
FIG. 1 is a communication system block diagram of a communication network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "user device," "end user device," "computing device," "client device," and "wireless device" are used interchangeably herein to refer to any one or all of satellite or cable set top boxes, laptop computers, rack mounted computers, routers, customer-premises equipment (CPE), cellular telephones, smart phones, personal or mobile multimedia players, convertible laptops/tablets (2-in-1 computers), personal data assistants (PDAs), personal computers, tablet computers, smart books, ultrabooks, notebooks, palmtop computers, desk-top computers, mobile gaming consoles, wireless electronic mail receivers, multimedia Internet enabled cellular telephones, wireless gaming controllers, streaming media players (such as, ROKU™), smart televisions, digital video recorders (DVRs), modems, and similar electronic devices which include a programmable processor and memory and circuitry for establishing wired or wireless communication pathways and for transmitting/receiving data via a telecommunications network as well as providing the functionality described herein. The term "computing device" may further refer to stationary computing devices including personal computers, desktop computers, all-in-one computers, workstations, super computers, mainframe computers, embedded computers, servers, home theater computers, and game consoles.

The terms "telecommunications network," "telecommunications system," "communications system," "service provider network," "service network," and "communication network," "home network" are used interchangeably herein to describe a transmission system that enables user data and control information to be exchanged between various sites, using wired and/or wireless infrastructure. Examples of telecommunication networks that may be used herein include cable television, internet, mobile networks, and combinations thereof. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iDEN). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The terms "gateway" and "gateway device" are used interchangeably herein to describe one or more device that allows a local area network (LAN) associated with a subscriber to connect to a wide area network (WAN) via a modem. The connection to the WAN may be performed using digital subscriber line (DSL)/ethernet, cable, fiberoptic, wireless satellite, a broadband or other type access technology. Examples of gateway devices that may be used herein include wired and wireless routers, wireless access points, cable modems, DSL modems, combined router/modem units, and network switches.

The terms "telecommunications service provider," "network service provider," "service provider", "multiple system operator", "communication service provider" and "network operator" are used interchangeably herein to describe a provider of telecommunications services that controls elements to sell and deliver services to an end user, and provides necessary provisioning and credentials as policies implemented in user device subscriptions.

The terms "user data," "subscriber data," and "device data" are used interchangeably herein to refer to data traffic that is configured for transmission to or reception from one or more user device across or through a service provider network.

The term "server" is used herein to describe any computing device capable of functioning as a server, such as a master exchange server, web server, mail server, document server, or any other type of server. A server may be a dedicated computing device or a computing device including a server module (e.g., running an application which may cause the computing device to operate as a server).

Telecommunications networks are widely deployed to provide various services, such as connectivity to an internet service provider (ISP) or a media content provider, sending and receiving voice data, packet data, broadcast messages, etc.

The terms "component," "system," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Many subscribers connect to the Internet via a customer premise equipment (CPE) component/device, such as a cable modem, digital subscriber line modem, router, switch, firewall, packet filter, wireless access point, and/or a residential gateway that provide network connectivity to home or small office network. In particular, a gateway device may allow user devices on the local area network (LAN) to connect to a wide area network (WAN) and ultimately the Internet. A gateway device may include LAN or Ethernet ports, and a LAN-interface for communicating with the user devices within the local network The gateway device may include a WAN port (e.g., port FE4, etc.) and a WAN-interface that allows the user devices to communicate with devices outside of the local network.

Dynamic Host Configuration Protocol (DHCP) is a network management protocol in which a DHCP server dynamically assigns an Internet Protocol (IP) address and other network configuration parameters to each user device on the LAN to enable communication with other IP networks on the WAN. An access gateway may include a DHCP server that enables user devices to request IP addresses and networking parameters automatically from the service provider, thereby reducing the need for a network administrator or a user device to manually assign the IP addresses.

The DHCP server within the service provider network may store IP addresses and information about client configuration parameters such as default gateway, domain name, the name servers, time servers, media access control (MAC) addresses, host-names, etc. A user device requesting service may broadcast a DHCP query for network information, which may be serviced by the DHCP server sending network information to that device. The network information may include a network address, and lease information that identifies a time period after which the network information will no longer be valid. The user device may request to renew or extend the lease, and the DHCP server may assign the device the same or different address each time the lease is renewed. In this manner, the gateway enables Internet access for subscriber user devices.

There are a number of scenarios and occasions in which it would be beneficial for the service provider network to be able to interrupt network service to a subscriber/customer in order to provide a mandatory interaction or engagement. Such scenarios may include, for example, accounting functions for overdue payment, violations of terms of service, or notifications of upcoming rate changes, subscription offers, necessary equipment upgrades, network maintenance, etc. Another such scenario may be that a necessary communication with the subscriber has been unsuccessful through routine channels (e.g., using customer email, SMS, etc.) Another such scenario may be when customer equipment that has been connected to the network but is not yet associated with an account or service purchase.

Therefore, the various embodiments may use service disruption as a mechanism for urgent communication with a subscriber, which may be done through account/subscriber-specific dynamic content to presented to user devices associated with the subscriber. That is, a service provider may use deployed network assets to provide communications that are targeted to a specific customer.

In various embodiments, the service provider may access information regarding a particular customer, and based on the context, configure hardware associated with the customer's local area network to load content pushing a communication from the service provider when appropriate. In various embodiments, the communication may be content that is presented in a browser window on a user device associated with the customer.

In this manner, the service provider network may respond to a service disruption condition triggered by the customer or the equipment by loading content to the gateway device that is tailored to the particular service disruption context. Such disruption conditions may include, for example, various non-payment situations. For example, in instances in which a customer fails to pay a bill for services, after a certain time period the service provider network may recognize a service disruption condition, and configure the associated gateway device with dynamically-generated content related to the non-payment. When a user device associated with the customer LAN attempts to access the service provider network, the device operating system and software embedded within the operating system will be in the path of the non-payment content. When the content is presented to the user device, it may also include an opportunity for customer action in order to resolve the service disruption experience, and re-enable normal service. For example, the content may include a link to a payment site hosted by the service provider network.

The various embodiments may be implemented within a variety of communications systems, an example of which is illustrated in FIG. 1. The communications system 100 may be used by a multiple system operator (MSO), internet service provider (ISP), cellular service provider, or other type of service provider that facilitates messaging and/or other network-based messaging/signaling between one or more server connected to the Internet or other external network.

The communications system 100 may include a plurality of end user devices 102 (e.g., 102a, 102b, 102c, 102d collectively referred to as end user devices 102), which may be configured to communicate via a Wi-Fi network, a cellular telephone network, a radio access network, a WiMAX network, and/or other well-known technologies. End user devices 102 may each be configured to receive and transmit data and control signals to and from an access point 110 (e.g., a wireless access point, router, hub, broadband gateway, base station, etc.) which may be coupled to a controller operable to transmit the data and control signals between to other network destinations. The controller may be, for example, a service gateway, wireless LAN controller (WLC), cellular base station, radio network controller, etc. The access point 110 may communicate with an access gateway 112 (e.g., a packet data network gateway (PGW), a cable modem termination system (CMTS), a wireless access gateway (WAG), broadband network gateway, etc.) that serves as the primary point of entry and exit for end user device traffic. The access gateway 112 may be implemented in a single computing device or in many computing devices.

Functions of the access gateway 112 may include, but are not limited to, forwarding data and control signals to network components as user data packets, providing connectivity to external data sources/networks, managing and storing network/internal routing information, and/or acting as a bridge between different technologies (e.g., Wi-Fi, broadband, 3G/4G/5G systems, etc.). The access gateway 112 may also coordinate the transmission and reception of data to and from the Internet 114, and the transmission and reception of voice, data and control information to and from an external service network connected to the Internet 114, as well as other access points 110.

The access gateway 112 may connect the end user devices 102 to a service network 116 either directly or via the Internet 114. The service network 116 may control a number of services for individual subscribers, such as management of billing data and selective transmission of data, such as multimedia data, to a specific end user device 102. The service network 116 may be implemented in a single computing device or in many computing devices, and typically includes one or more server 120, such as a media server of a content provider, a communication server, etc. Each end user device 102 may be, for example, a smartphone, a laptop computer, a tablet computer, a smartphone, or any other suitable end point device capable of connecting to a LAN. In general, the end user devices 102 may include a platform that can receive and execute software applications, data and/or commands transmitted over the communication network that may ultimately come from the service network 116, the Internet 114 and/or other remote servers and networks.

The various embodiments are particularly useful with broadband (e.g., fiberoptic, wireless satellite, cable modem or DSL modem etc.) networks to obtain access to service provider core network. However, the embodiments may also be implemented over any combination of wireless and/or wired networks and access protocols, with no changes to the methods.

The service provider in various embodiments may implement a number of services and functions to support cable and/or Internet services for subscribers. For example, a service provider network may include an operations support system/business support system (OSS/BSS) that provides network management and/or other functions. The OSS/BSS functions may also include security services, and business policies to provide a subscriber with the option to apply various customizations for their LAN (e.g., parental control parameters, access to peripheral devices, etc.).

The term "system-on-chip" or "SoC" is used herein to refer to a set of interconnected electronic circuits typically, but not exclusively, including multiple hardware cores, a memory, and a communication interface. The hardware cores may be of a variety of different types of processors, such as a multi-core central processing unit (CPU), a multi-core digital signal processor (DSP), a multi-core accelerated processing unit (APU), and a multi-core auxiliary processor.

Figure 2:
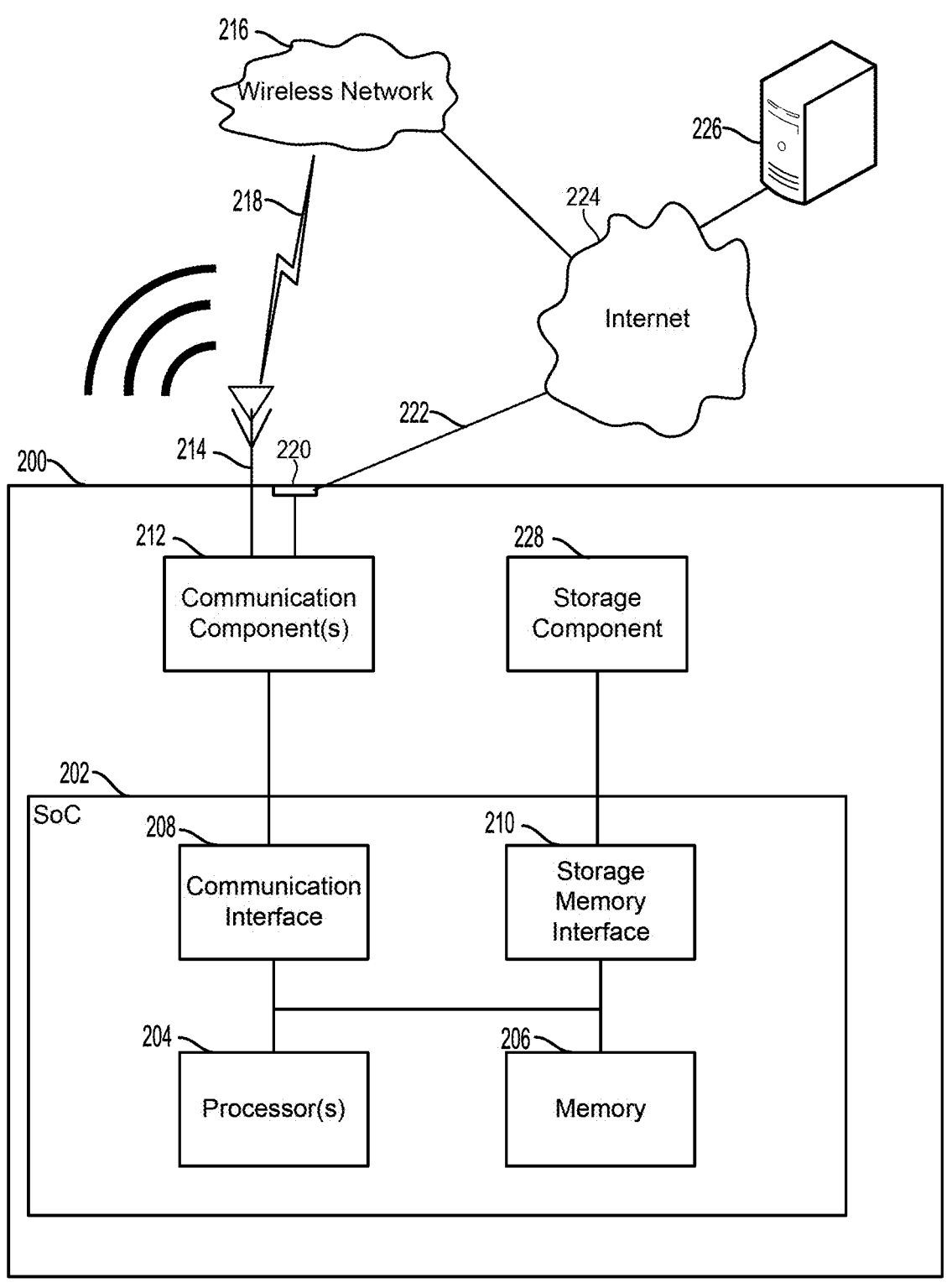
FIG. 2 is a component block diagram illustrating a computing device suitable for implementing an embodiment.

FIG. 2 illustrates an example of a gateway device 200 associated with a subscriber that may be suitable for use with the various embodiments. With reference to FIGS. 1-2, the gateway device 200 may be an example of one or more access point 110 and/or access gateway 112. In some embodiments, the gateway device 200 may be any terminal or equipment that is located at the subscriber's premises (e.g., a residence, a workspace, etc.), and connected to a communication service provider's network at the demarcation point with the service provider network. The gateway device 200 may be a residential gateway, examples of which may include a wired or wireless router, cable modem, DSL modem, network switch, wireless access point, internet access gateway, or unit that functions as a combination thereof. In some embodiments, the gateway device 200 may be any device (e.g., a set-top box, fixed mobile convergence product, or subscriber unit) that accesses, and/or enables devices connected to a LAN to access, services offered by a communication service provider.

The gateway device 200 may include a SoC 202 with a processor 204, a memory 206, a communication interface 208, and a storage memory interface 210. The gateway device 200 may further include at least one communication component 212, such as a network adapter supporting Fast Ethernet or Gigabit Ethernet, a modem (e.g., xDSL DOCSIS, LTE, fiber optic, etc.), a radio frequency (RF) transceiver, and/or a wireless network adapter for Wi-Fi (IEEE 802.11), Bluetooth, etc. Specifically, a communication component(s) 212 supporting wireless communications may include receiver and transmitter circuitry coupled to at least one antenna 214, and configured to perform transmit/receive functions in particular RF spectrum frequency range(s).

A communication component(s) 212 and corresponding antenna(s) 214 may be configured to send data to, and receive data from, devices within a WLAN using a supported wireless communication protocol. Further, a communication component(s) 212 and corresponding antenna 214 may be configured to access an external wireless network 216 for additional features and/or network services. A connection 218 to the wireless network 216 may use any of a number of wireless standards, for example, Wi-Fi, WiMAX, or mobile VoIP, and/or may be based on mobile broadband or cellular network technology. Examples of wireless networks based on cellular network technology may include Code Division Multiple Access (CDMA) networks, Time Division Multiple Access (TDMA) networks, and Frequency Division Multiple Access (FDMA) networks. The wireless network 216 may utilize various radio technologies such as Wideband-CDMA (W-CDMA), cdma2000, Global System for Mobile Communications (GSM), etc.

A communications component(s) 212 may also be coupled to a network interface 220 that supports a wired connection 222 to the internet 224. The gateway device 200 may communicate with, for example, one or more remote computing device 226 over the wireless connection 218 and/or the wired connection 222. In some embodiments, the remote computing device may be a server of a content or other service provider.

The gateway device 200 may include one or more controller, on which any of a variety of processing devices of the SoC 202 (e.g., processor(s) 204) may be implemented, and may include a number of processing cores. The gateway device 200 may also include processors that are not associated with a SoC 202.

The memory 206 of the SoC 202 may be configured for storing data and processor-executable code for access by the processor 204. The memory 206 may include, for example, volatile memory configured to temporarily hold a limited amount of data received from a data sensor or subsystem.

The gateway device 200 may also include a storage component 228, which may be a non-volatile memory device (e.g., a read-only memory, flash memory, hard disk drive, solid state drive, etc.). The storage memory interface 210 and storage component 228 may work in unison to allow the gateway device to store data and processor-executable code on a storage medium. The storage memory interface 210 may control access to the storage component 228, and may allow the processor 204 to read data from and write data to the storage component 228.

The communication interface 208, communication component(s) 212, antenna(s) 214, and/or network interface 28, may work in unison to enable the gateway device 200 to communicate over the wireless network 216 via a wireless connection 218, and/or a wired connection 222 with the remote computing device 226. As described, the wireless network 216 may be implemented using a variety of wireless communication technologies, including, for example, radio frequency spectrum used for wireless communications, to provide the gateway device 200 with a connection to the Internet 224 by which it may exchange data with the remote computing device 226.

It should be noted that some or all of the components of the gateway device 200 may be differently arranged and/or combined while still serving the necessary functions. Moreover, the gateway device 200 may not be limited to one of each of the components, and multiple instances of each component, in various configurations, may be included in the gateway device 200.

As described, dynamic content may be generated in various embodiments based on subscriber data that is stored by or accessible to the service provider network, and other relevant context information. Such data may include a billing state of the account, location of the equipment, current state of the operator network (e.g., any known service degradation issues), etc. The dynamic content may be constantly changed such that a new message may be presented to the customer, regardless of the client device, anytime a DHCP request is relayed through the same gateway device.

In the various embodiments, the initial configuration information received by the gateway device from the operator network DHCP server may include a web address (e.g., Uniform Resource Locator (URL)) of a dynamic content service hosted within the operator network. Upon receipt, the gateway device may contact the dynamic content service, providing a hardware-specific identifier (e.g., MAC address). Since the gateway device is typically provided by or controlled by the network operator, the identifier may be used to retrieve information associated with the linked subscriber account (if any), and to generate dynamic content specific to the gateway device when a service disruption condition is met. In particular, the account/subscriber-specific dynamic content may inform a customer about causes for network interruption or severely degraded service levels.

The gateway device may configure a local web server on the default gateway address to host the account/subscriber-specific dynamic content. Many network clients, such as browsers and mobile applications, have a mechanism to navigate to the default gateway (e.g., 192.168.1.1 or similar) to access public Internet resources. As a result of the various embodiments, all user devices within the LAN, when navigating to the default gateway, will load the account/subscriber-specific dynamic content. Therefore, the user device(s) may display information about the condition that must be resolved or action taken before access to the Internet is restored. Potential reasons for network interruption according to various embodiments may include a service level indication, a billing issue, a fraud or security warning, a network issue (e.g., with an expected outage window), a general notice from the service provider, notice that setup is required (e.g., with self-install instructions), notice that an equipment swap is required, a seasonal suspension, and others.

Figure 3:
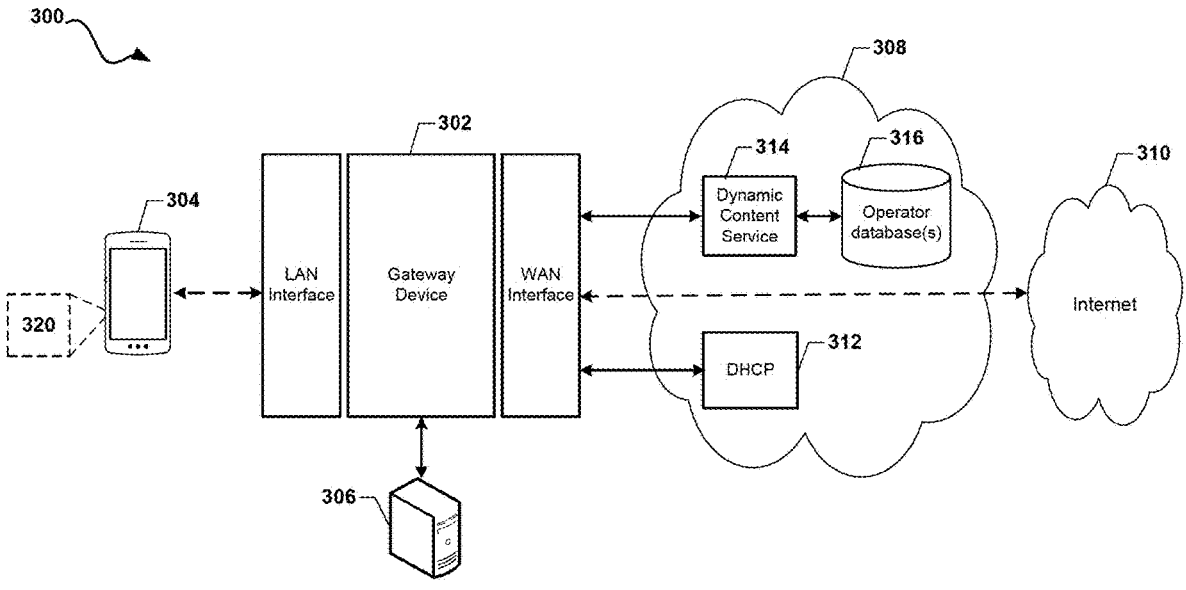
FIG. 3 is a block diagram illustrating an example software architecture configured to support generating and providing account/subscriber-specific dynamic content in a system configuration according to various embodiments.

FIG. 3 illustrates components of a telecommunications system 300 configured to support hosting dynamic content generated by a service provider on a gateway device. In various embodiments, the components of system 300 may be implemented as separate functions through any combination of software and hardware, and may be distributed across a number of different devices and/or servers.

With reference to FIGS. 1-3, the system 300 may be similar to the communications system 100, and may be implemented by a service provider offering communication services to customers/subscribers.

In some embodiments, a subscriber's home network may be formed through a gateway device 302 (e.g., gateway device 200). Examples of gateway devices may include, but are not limited to, wired and wireless routers, DSL modems, cable modems, fiber modems, wireless modems, dedicated phone connections such as T1 devices, and other devices that interface a communication line to a network. The gateway device 302 may include functionality associated with multiple communications, as well as incorporating multiple network components.

The network components may be implemented as functionally separate software modules, as physically separate hardware components, or a combination thereof. Specifically, network component functions that may be incorporated within the gateway device 302 include a mapping of address and port using translation (MAP-T) feature that provides connectivity to IPv4 hosts across IPv6 domains on a subscriber CPE (i.e., home gateway). The network component functions may also include internal-to-the-home DHCP server functions, firewalls, VPN, wireless access point functions, etc. Further, the gateway device 302 may be assigned any of a variety of unique identifiers, such as a DSL modem identifier, a Data Over Cable Service Interface Specification (DOCSIS) identifier, a Basic Line Privacy Interface (BPI+) identifier, and/or others.

The gateway device 302 may connect at least one end user device 304. In various embodiments, the end user device(s) 304 may be a customer's own devices (e.g., smartphones, laptop computers, etc.) within a LAN, which may be directly connected to the gateway device 302. In some embodiments, the subscriber may be a small business or other entity, such that a local access point router (e.g., employing a NAT/firewall) may be a connected device intended to provide guest Internet access to a group of users.

In various embodiments, the gateway device 302 may be configured to connect to one or more local web server 306, or other computer system capable of delivering content. The gateway device 302 may provide each end user device 304 with connectivity to a service provider network 308. The service provider network 308 may perform functions that are distributed across various servers of the core network, or may be implemented on the same server(s).

The gateway device 302 may be any of a variety of devices, such as a router, modem, switch, gateway, or any network processing equipment that can be used to provide an interface for end user devices to an external network via a connection or communication link. In various embodiments, the gateway device 302 may implement access between end user devices 304 connected through a LAN interface, to one or more WAN (e.g., the Internet 310) via a WAN interface. In various embodiments, the gateway device 302 may be initially provisioned and configured by a network operator (e.g., the service provider network 308).

The service provider network 308 may include various components and entities, including at least a DHCP server 312, a dynamic content service 314, and one or more operator database 316 that supports the dynamic content service 314.

The gateway device 302 (e.g., a modem) may send an initial configuration request to the DHCP server 312, including various information fields. The DHCP server 312, using the information included in the configuration request, may generate and send a response message with network and lease information (e.g., lease granted or denied, lease terms, etc.).

Upon receiving the DHCP response message, the gateway device 302 may use the network and lease information provided to establish an IP connection to the service provider network 308. In various embodiments in which a dynamic content service 314 is enabled, the DHCP response message may include a URL of the dynamic content service 314. In this manner, when a request for initial configuration and/or to establish a new Internet connection is received from the end user device(s) 304, the gateway device 302 may be prompted to contact the dynamic content service 314.

The service provider network 308 may implement a number of services and functions. For example, the service provider network 308 may include an operations support system/business support system (OSS/BSS) that provides network management and/or other functions. Such functions may include equipment/subscriber management, network operations, security, business policies, etc. In various embodiments, information from such services and functions of the operator database(s) 316 may be used by the dynamic content service 314 to generate device- or customer-specific dynamic content.

For example, operator database(s) 314 may include general customer information (e.g., equipment, services registered, and billing information), accounting information (e.g., accounts that are more than a threshold amount of time overdue in payment), subscriber violations (e.g., accounts for which DMCA takedown notice was received for that account, violation of terms of service, etc.), equipment status (e.g., listing customer premises equipment that is on-site but does not have an established subscriber/contract, customer premises equipment that needs to be updated, etc.), service updates (e.g., customers for whom a rate change is soon to go into effect, for whom an additional service or discount rate is available, or for whom fair access policy limits on bandwidth have been reached), contact information (e.g., customers that the service provider has unsuccessfully tried to contact through other means).

The dynamic content service 314 may be one or more entity configured to perform operations including querying the operator database(s) 316 to retrieve relevant customer and/or equipment information using a hardware-specific identifier (e.g., the MAC address of the gateway device). Based on such information, the dynamic content service 314 may determine whether dynamic content for the gateway device 302 should be generated, and the parameters for such content. That is, the dynamic content service 314 may generate content specific to a customer situation by recognizing one of a number of pre-configured reasons for service disruption, and using a template corresponding to the pre-configured reason. Using the template and the customer information, the dynamic content service 314 may develop the dynamic content.

In various embodiments, the dynamic content service 312 may have a module configured to store number of service interruption codes and corresponding content templates, which may be classified based on type. In some embodiments, such information may be stored on a separate database that is accessible to the dynamic content service 312.

In various embodiments, the content generated by the dynamic content service 314 may be delivered to an end user device 304 as a captive portal landing page. In particular, the gateway device 302 may receive a web address (e.g., URL) for any hardware-specific dynamic content generated by dynamic content service 314. The gateway device 302 may configure a local web server (e.g., 306) on the default gateway address to host such hardware-specific content.

When an end user device 304 attempts to access Internet services, hardware-specific content hosted at the default gateway address may be passed to the end user device 304. In some embodiments, the content may be presented to a customer by loading a web page and displaying the content 320 on an interface of the end user device 304 (for example, in a browser).

In various embodiments, the displayed content 320 may be configured to engage the client/customer, providing a way for resolving the service disruption. For example, the displayed content 320 may be a link to a webpage for paying an overdue bill, for setting up service, or for scheduling an appointment for exchanging equipment or receiving other service upgrade. In another example, the displayed content 320 may present information and/or terms and conditions, along with an option for the customer to acknowledge having read the information or accept the terms and conditions. Once the service disruption condition is resolved, normal Internet service may be restored. For example, the dynamic content service 314 may inform the gateway device 302 that there is no longer any hardware-specific dynamic to be received, causing the default gateway to revert to the LAN or other default address to obtain normal Internet access.

In various embodiments, the communications network 300 may include additional network edge equipment such as an edge site, exchange, or interface device that enables access to the network backbone for discrete LANs. Such additional network edge equipment may depend on the type of physical networking layer used to provide services to subscribers, For example, for a service operator providing services over a hybrid fiber-coaxial (HFC) network, the additional network edge equipment may be a CMTS, and the gateway device 302 may include cable modem functionality. In another example, for a service operator providing services using a DSL network, additional network edge equipment may be a DSL access multiplexer (DSLAM), and the gateway device may include DSL modem functionality.

The service provider network 308 may provide access to at least one other network(s), such as the Internet 310. In this manner, the end user device(s) 304 may establish communications with content provider(s), additional services, and/or remote computing devices (e.g., other user devices).

FIG. 4 illustrates a method 400 of providing hardware-specific dynamically-generated content to a customer according to some embodiments. With reference to FIGS. 1-4, the operations of the method 400 may be implemented by one or more control entity within a local area network, such as a gateway device (e.g., gateway device 200, access point 110 and/or access gateway 112). may be an example of one or more access point 110 and/or access gateway 112. Some operations of the method 500 may additionally or alternatively be implemented by one or more control entity within the service provider network (e.g., 116, 308), such as on one or more processor of one or more server and/or remote computing device.

In block 402, the gateway device may receive initial configuration information from the operator network DHCP server. For example, such initial configuration information may be sent by the DHCP server in response to a request from the gateway device requesting configuration. In various embodiments, the configuration request may be prompted by a new customer account setup associated with the gateway device, by the remaining DHCP lease time, etc. In addition to standard configuration parameters, in various embodiments the initial configuration information may include, a web address (e.g., a URL) for a dynamic content service hosted within the operator network.

In block 404, the gateway device may send a request to the dynamic content service that includes a device identifier. In various embodiments, the device identifier may be a hardware-specific identifier assigned to the gateway device, such as the MAC address. Since the gateway device is provided by or otherwise associated with the network operator, the network may collect information about relevant device status, customer or subscriber account, etc. based on such device identifier.

In determination block 406, the gateway device may determine whether dynamic content has been received in response to the request to the dynamic content service. In response to determining that dynamic content has been received in response to the request (i.e., determination block 406="Yes"), the gateway device may configure a local web server on the default gateway address to host the received dynamic content in block 408.

In determination block 410, the gateway device may determine whether a request from a client device to access an Internet resource is detected. In response to determining that there is no request from a client device to access an Internet resource (e.g., determination block 410="No"), the gateway device may return to determination block 410 to continue monitoring for such request.

In response to determining that a request from a client device to access an Internet resource is detected (i.e., determination block 410="Yes"), the gateway device may cause the client device to load and display the dynamic content at the default gateway address in block 412.

In various embodiments, the dynamic content may provide the customer with information about a service disruption condition, as well as how to mediate the condition. For example, the dynamic content may inform the customer of a billing issue (e.g., overdue account), and provide the option to navigate to a bill pay site within the operator network. In another example, the dynamic content may inform the customer of a fraud or security warning, and instruct the customer to call the service provider to verify account information In another example, the dynamic content may inform the customer of a network issue (e.g., known outage/maintenance), and request the customer to acknowledge the information relayed.

In a further example, the dynamic content may provide information that account setup or equipment activation is required, and provide the option to navigate to a site with self-install instructions. In a further example, the dynamic content may provide information that an equipment change or upgrade is required, and provide the option to navigate to a site to schedule a service appointment or information to call customer support.

In some embodiments, the dynamic content for the gateway device may be provided in the form of HTML, to be displayed by a web browser on a client device. In some embodiments, the dynamic content for the gateway device may be provided as readable text, or other format available for different applications and/or client devices operating in the LAN (e.g., smart appliances, Internet of Things (IoT) devices, etc.).

In determination block 414, the gateway device may determine whether the required action was taken to mediate the service disruption. The specific mediation action required in various embodiments may depend on the service disruption condition, and may be available through information displayed by the client device as described above.

In response to determining that the required action to mediate the service disruption was not taken (i.e., determination block 414="No"), the gateway device may return to determination block 414 to continue monitoring for such action.

In response to determining that the required action to mediate the service disruption was taken (i.e., determination block 414="Yes"), or in response to determining that dynamic content has not been received (i.e., determination block 406="No"), the gateway device may perform block 416 to enable normal Internet access for the requesting client device(s) within the customer's LAN(s). For example, the gateway device may assign an available IP address to a client device using the pool of available addresses, and/or connecting the LAN to the Internet as the default gateway.

FIG. 5 illustrates a method 500 of using a dynamic content service to generate hardware-specific content based on service disruption conditions. With reference to FIGS. 1-5, the operations of the method 500 may be implemented by one or more control entity within an operator network (e.g., service network 116, service provider network 308), such as on one or more processor of one or more server (e.g., 120).

In block 502, the service network processor may configure a gateway device to access the dynamic content service hosted by the operator network. In some embodiments, configuring the gateway device may be done through the initial configuration information provided by a DHCP server in the operator network. In some embodiments, such initial configuration information provided to the gateway device may include a web address (e.g., URL) of the dynamic content service.

In block 504, the service network processor may receive a dynamic content request from the gateway device. The dynamic content request may include, among other information, an account/subscriber identifier for the gateway device. In various embodiments, the account/subscriber identifier may be a unique hardware identifier (e.g., MAC address) that is able to key into an enriched data set in the operator network. In some embodiments, the dynamic content request in block 504 may be triggered by a client device within the gateway device LAN attempting to access an Internet resource.

In block 506, the service network processor may access data sources supporting the dynamic content service to retrieve information about the gateway device and/or the customer. Specifically, the network operator may use the account/subscriber identifier to probe multiple databases and/or systems, providing data about the gateway device and any associated customer account to the dynamic content service. Such data sources may include, for example, a billing and accounting system and/or database that enables access to lists of customers who are a certain amount of time past due on payment (e.g., 30 days past due, 60 days past due, etc.). The billing and accounting system and/or database may also provide information about the services for which the customer is subscribed, the customer's contact information, address, etc. Data sources may also include, for example, network operations system and/or database that includes specifications of the customer's equipment, including the gateway device, and information about the customer's usage of the service(s) (e.g., network speeds, any data thresholds that have been surpassed, etc.).

In determination block 508, the service network processor may determine whether a service disruption condition is met. In some embodiments, this determination may be a function of the dynamic content service, and may be based on the information about the device and/or customer collected in block 506. In various embodiments, the dynamic content service may be preconfigured with various criteria associated with a plurality of service disruption conditions, which may be applied to the collected data to determine whether one or more are fulfilled.

In response to determining that no service disruption condition is met (i.e., determination block 508="No"), the method 500 may end.

In response to determining that a service disruption condition is met (i.e., determination block 508="Yes"), the service network processor may generate hard-ware-specific dynamic content based on the particular service disruption condition in block 510.

In some embodiments, generating the hardware-specific dynamic content may be accomplished by using a pre-loaded template corresponding to the service disruption condition. Specifically, the dynamic content service may be configured with a plurality of templates, each linked to a service disruption condition using, for example, a service disruption code. If a particular service disruption condition is satisfied, the dynamic content service may retrieve the pre-loaded template matching the service disruption code, and use the customer and/or device information to generate the account/subscriber-specific dynamic content.

In some embodiments, the pre-loaded templates may be designed to match the particular type of customer engagement. For example, there may be a plurality of overdue payment service disruption codes, each of which may be associated with a different template (e.g., one for communicating that the customer is 30 days past due, one for communicating that the customer is 60 days past due, etc.).

In block 512, the service network processor may send the hardware-specific dynamic content to the gateway device for presenting to client device(s). In some embodiments, upon receiving a request for Internet access from a client device, the gateway device may communicate with the customer by presenting the dynamic content (e.g., through a webpage, through plain text, etc.).

Figure 6:
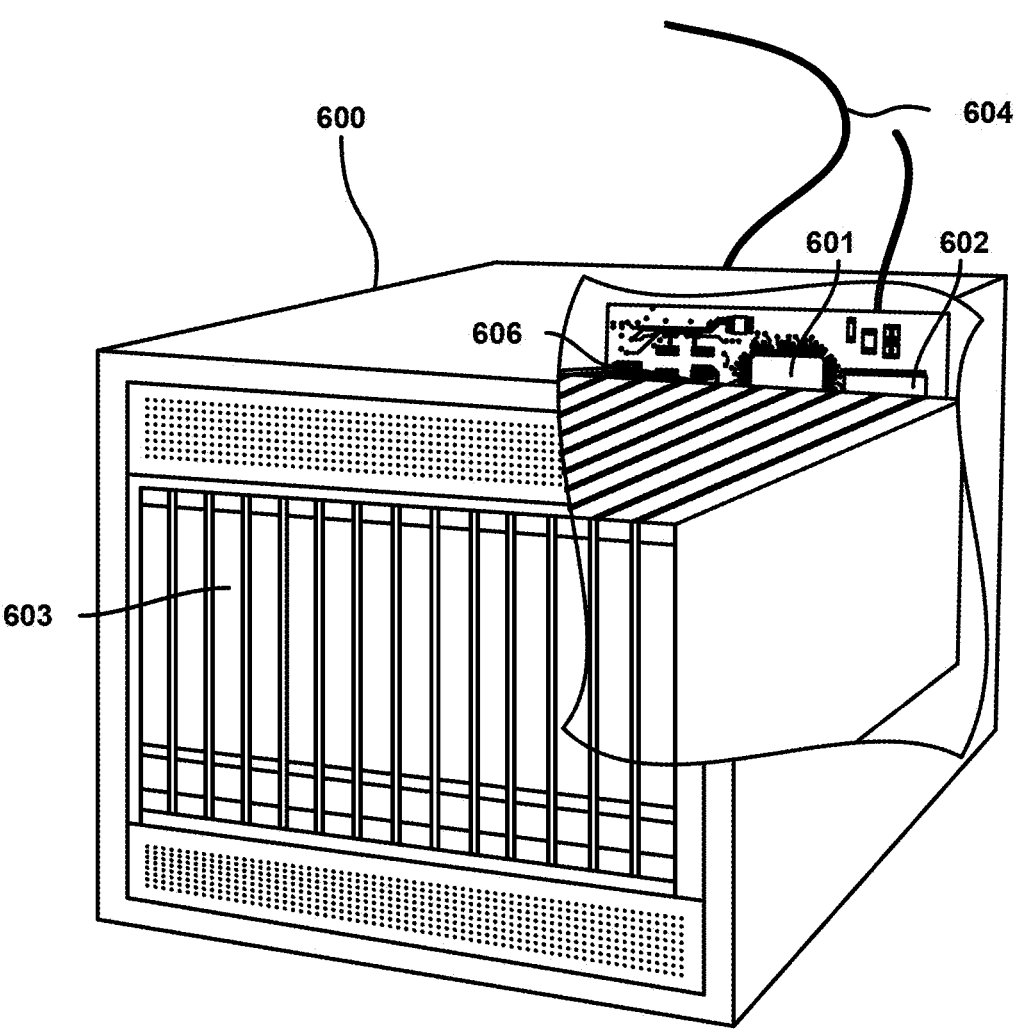
FIG. 6 is a component block diagram of an example server suitable for use with various embodiments.

The various embodiments may be implemented on any of a variety of commercially available server devices, such as the server 600 illustrated in FIG. 6. For example, with reference to FIGS. 1-6, a server 600 (which may correspond, for example, to the server 120 and/or the remote computing device 226 in FIGS. 1 and 2, respectively) may include a processor 601 coupled to volatile memory 602 and a large capacity nonvolatile memory, such as a disk drive 603.

The server 600 may also include a floppy disc drive, compact disc (CD) or DVD disc drive 603 coupled to the processor 601. The server 600 may also include network access ports 606 coupled to the processor 601 for establishing network interface connections with a network, such as a local area network coupled to other broadcast system computers and servers, the Internet, the public switched telephone network, and/or a cellular data network (e.g., CDMA, TDMA, GSM, PCS, 3G, 4G, 5G, LTE, or any other type of cellular data network). Such interface connections may be made through wired connections 604.

Figure 7:
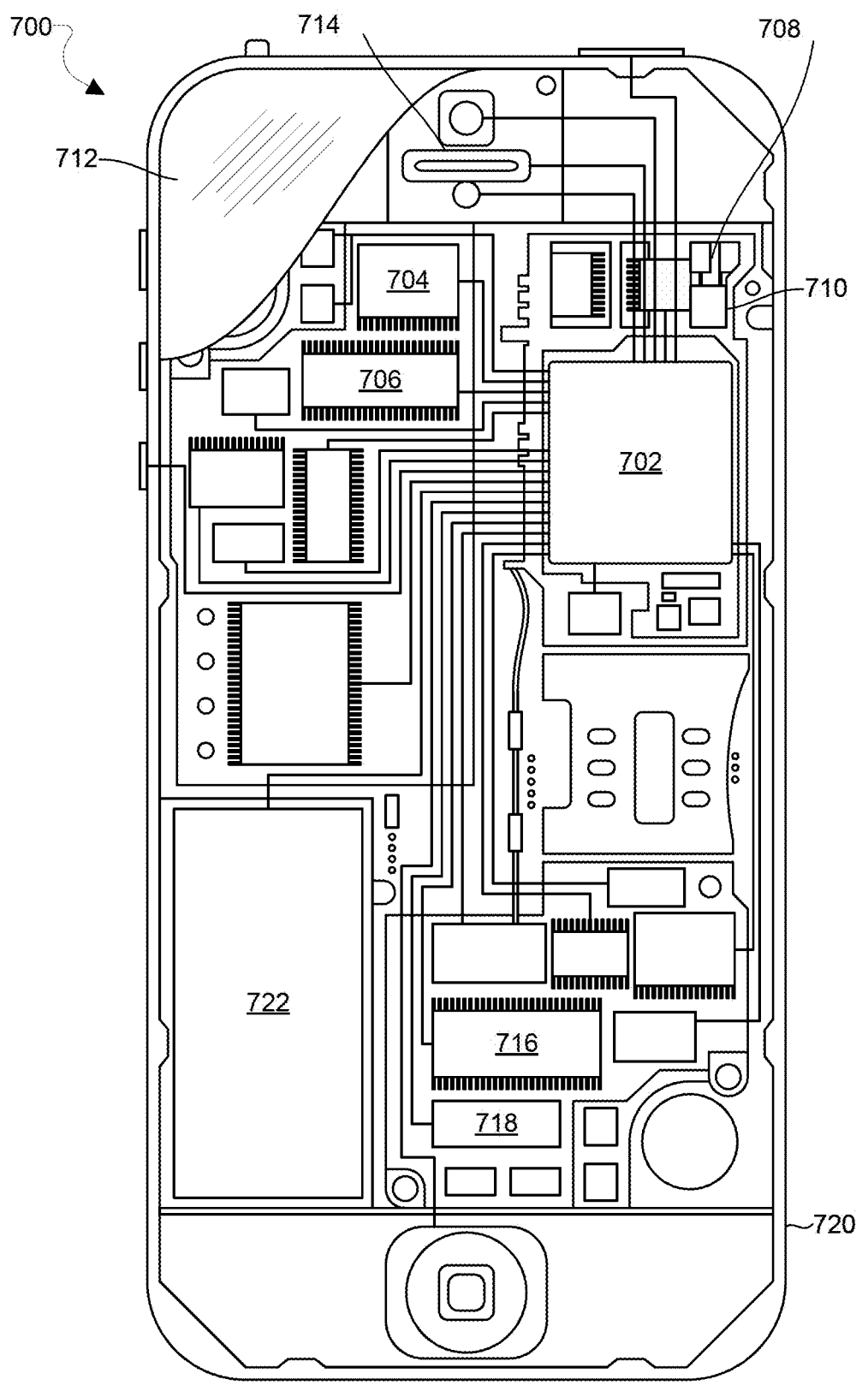
FIG. 7 is a component diagram of an example wireless communication device suitable for use with the various embodiments.

Various embodiments may also be implemented in any of a variety of wireless devices, an example of which is illustrated in FIG. 7. For example, with reference to FIGS. 1-7, a wireless device 700 (which may correspond, for example, the end user devices 102 and/or the gateway device 200 in FIGS. 1 and 2, respectively) may include a processor 702 coupled to a touchscreen controller 704 and an internal memory 706. The processor 702 may be one or more multicore integrated circuits (ICs) designated for general or specific processing tasks. The internal memory 706 may be volatile or non-volatile memory, and may also be secure and/or encrypted memory, or unsecure and/or unencrypted memory, or any combination thereof.

The touchscreen controller 704 and the processor 702 may also be coupled to a touchscreen panel 712, such as a resistive-sensing touchscreen, capacitive-sensing touchscreen, infrared sensing touchscreen, etc. The wireless device 700 may have one or more radio signal transceivers 708 (e.g., Peanut®, Bluetooth®, Zigbee®, Wi-Fi, RF radio) and antennae 710, for sending and receiving, coupled to each other and/or to the processor 702. The transceivers 708 and antennae 710 may be used with the above-mentioned circuitry to implement the various wireless transmission protocol stacks and interfaces. The wireless device 700 may include a cellular network wireless modem chip 716 that enables communication via a cellular network and is coupled to the processor. The wireless device 700 may include a peripheral device connection interface 718 coupled to the processor 702. The peripheral device connection interface 718 may be singularly configured to accept one type of connection, or multiply configured to accept various types of physical and communication connections, common or proprietary, such as USB, FireWire, Thunderbolt, or PCIe. The peripheral device connection interface 718 may also be coupled to a similarly configured peripheral device connection port (not shown).

The wireless device 700 may also include speakers 714 for providing audio outputs. The wireless device 700 may also include a housing 720, constructed of a plastic, metal, or a combination of materials, for containing all or some of the components discussed herein. The wireless device 700 may include a power source 722 coupled to the processor 702, such as a disposable or rechargeable battery. The rechargeable battery may also be coupled to the peripheral device connection port to receive a charging current from a source external to the wireless device 700.

The processors 601, 702, and modem or modem chip 716 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in an internal memory before they are accessed and loaded into the processors 601, 702, and modem or modem chip 716. The processors 601, 702, and modem or modem chip 716 may include internal memory sufficient to store the application software instructions. In many devices the internal memory may be a volatile or nonvolatile memory, such as flash memory, or a mixture of both. For the purposes of this description, a general reference to memory refers to memory accessible by the processors 601, 702, and modem or modem chip 716, including internal memory or removable memory plugged into the wireless communication device and memory within the processors 601, 702, and modem or modem chip 716 themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of providing subscriber-specific dynamic content by an operator network, the method comprising:

configuring, by one or more server computing device in the operator network, a gateway device for at least one user local area network (LAN) to access a dynamic content service;

receiving, by the one or more server computing device, a dynamic content request from the gateway device;

accessing, by the one or more server computing device, data sources supporting the dynamic content service to retrieve information about a user device;

determining, by the one or more server computing device, whether any service disruption condition has been met; and in response to determining that a service disruption condition has been met:

generating, by the one or more server computing device, subscriber-specific dynamic content for the user device based on the service disruption condition met; and sending, by the one or more server computing device, the generated subscriber-specific dynamic content to the gateway device for presenting to the user device.

2. The method of claim 1, wherein configuring the gateway device comprises:

sending, by the one or more server computing device, Dynamic Host Configuration Protocol (DHCP) configuration information to the gateway device, wherein the DHCP configuration information includes a web address for the dynamic content service.

3. The method of claim 1, wherein the received dynamic content request includes a device identifier assigned to the gateway device, and wherein the retrieved information about the user device comprises at least one of customer data or equipment data associated with the device identifier.

4. The method of claim 3, wherein the device identifier comprises a media access control (MAC) address.

5. The method of claim 1, wherein determining whether any service disruption condition has been met comprises determining whether the retrieved information about the user device fulfills any of a plurality of predetermined criteria sets designated by the operator network.

6. The method of claim 1, wherein the data sources supporting the dynamic content service include at least one entity with information about one or more of customer billing, subscriptions, network equipment, and network usage.

7. The method of claim 1, wherein generating the subscriber-specific dynamic content for the user device is based on a preloaded template corresponding to the service disruption condition met.

8. The method of claim 1, wherein the subscriber-specific dynamic content includes information to enable the user device to mediate the service disruption condition.

9. A method of providing dynamic content generated by a communications service provider to one or more client device, the method comprising:

receiving, by a gateway device associated with a local area network (LAN) for the one or more client device, information to access a service provider network, wherein the information comprises instructions to contact a dynamic content service within the service provider network;

sending, by the gateway device, a request including a hardware-specific identifier to the dynamic content service;

determining, by the gateway device, whether dynamic content is received in response to the request; and in response to determining that dynamic content is received:

configuring, by the gateway device, a web server to host the received dynamic content on a default gateway address, wherein the dynamic content informs the one or more client device in the LAN about a cause of network service disruption.

10. The method of claim 9, further comprising:

sending, by the gateway device, a request to a Dynamic Host Configuration Protocol (DHCP) server in the service provider network, wherein the configuration information is received from the DHCP server in response to the request.

11. The method of claim 9, further comprising:

detecting, by the gateway device, a request from the one or more client device in the LAN to access an Internet resource through the service provider network; and causing, by the gateway device, the one or more client device to display the received dynamic content on a user device interface.

12. The method of claim 9, wherein the dynamic content displayed on the user device interface includes an instruction for mediating the network service disruption.

13. The method of claim 12, wherein the instruction for mediating the network service disruption comprises at least one of:

a link to a web page hosted by the service provider network;

readable text coupled with an acknowledgement of information in the text; and contact information for a customer service entity of the service provider network.

14. A server computing device, comprising:

a processor configured with processor-executable instructions to:

configure a gateway device for at least one user local area network (LAN) to access a dynamic content service within an operator network;

receive a dynamic content request from the gateway device;

access data sources supporting the dynamic content service to retrieve information about a user device;

determine whether any service disruption condition has been met; and in response to determining that a service disruption condition has been met:

generate subscriber-specific dynamic content for the user device based on the service disruption condition met; and send the generated subscriber-specific dynamic content to the gateway device for presenting to the user device.

15. The server computing device of claim 14, wherein the processor is configured to configure the gateway device by sending Dynamic Host Configuration Protocol (DHCP) configuration information to the gateway device, wherein the DHCP configuration information includes a web address for the dynamic content service.

16. The server computing device of claim 14, wherein the received dynamic content request includes a device identifier assigned to the gateway device, and wherein the retrieved information about the user device comprises at least one of customer data or equipment data associated with the device identifier.

17. The server computing device of claim 16, wherein the device identifier comprises a media access control (MAC) address.

18. The server computing device of claim 14, wherein the processor is configured to determine whether any service disruption condition has been met by determining whether the retrieved information about the user device fulfills any of a plurality of predetermined criteria sets designated by the operator network.

19. The server computing device of claim 14, wherein the data sources supporting the dynamic content service include at least one entity with information about one or more of customer billing, subscriptions, network equipment, and network usage.

20. The server computing device of claim 14, wherein the processor is configured to generate the subscriber-specific dynamic content for the user device based on a preloaded template corresponding to the service disruption condition met.

21. The server computing device of claim 14, wherein the subscriber-specific dynamic content includes information to enable the user device to mediate the service disruption condition.

22. A gateway computing device, comprising:

a processor configured with processor-executable instructions to:

receive information to access a service provider network, wherein the gateway computing device is associated with a local area network (LAN) for one or more client device, and wherein the information comprises instructions to contact a dynamic content service within the service provider network;

send a request including a hardware-specific identifier to the dynamic content service;

determine whether dynamic content is received in response to the request; and in response to determining that dynamic content is received:

configure a web server to host the received dynamic content on a default gateway address, wherein the dynamic content informs the one or more client device in the LAN about a cause of network service disruption.

23. The gateway computing device of claim 22, wherein the processor is further configured with processor-executable instructions to send a request to a Dynamic Host Configuration Protocol (DHCP) server in the service provider network, wherein the configuration information is received from the DHCP server in response to the request.

24. The gateway device of claim 22, wherein the processor is further configured with processor-executable instructions to:

detect a request from the one or more client device in the LAN to access an Internet resource through the service provider network; and cause the one or more client device to display the received dynamic content on a user device interface.

25. The gateway device of claim 22, wherein the dynamic content displayed on the user device interface includes an instruction for mediating the network service disruption.

26. The gateway device of claim 25, wherein the instruction for mediating the network service disruption comprises at least one of:

a link to a web page hosted by the service provider network;

readable text coupled with an acknowledgement of information in the text; and contact information for a customer service entity of the service provider network.

27. A non-transitory computer readable storage medium having stored thereon processor-executable software instructions configured to cause a server processor to perform operations for providing subscriber-specific dynamic content by an operator network, the operations comprising:

configuring a gateway device for at least one user local area network (LAN) to access a dynamic content service;

receiving a dynamic content request from the gateway device;

accessing data sources supporting the dynamic content service to retrieve information about a user device;

determining whether any service disruption condition has been met; and in response to determining that a service disruption condition has been met:

generating subscriber-specific dynamic content for the user device based on the service disruption condition met; and sending the generated subscriber-specific dynamic content to the gateway device for presenting to the user device.

28. The non-transitory computer readable storage medium of claim 27, wherein the stored processor-executable software instructions are configured to cause the server processor to perform operations such that configuring the gateway device comprises sending Dynamic Host Configuration Protocol (DHCP) configuration information to the gateway device, wherein the DHCP configuration information includes a web address for the dynamic content service.

29. The non-transitory computer readable storage medium of claim 27, wherein the received dynamic content request includes a device identifier assigned to the gateway device, and wherein the retrieved information about the user device comprises at least one of customer data or equipment data associated with the device identifier.

30. The non-transitory computer readable storage medium of claim 29, wherein the device identifier comprises a media access control (MAC) address.

* * * * *